(12) United States Patent
Burczyk et al.

(10) Patent No.: US 7,461,557 B1
(45) Date of Patent: Dec. 9, 2008

(54) DYNAMIC PRESSURE TRANSMITTER

(75) Inventors: Dietfried Burczyk, Teltow (DE);
Wolfgang Dannhauer, Teltow (DE);
Ralf Nürnberger, Potsdam (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 0 days.

(21) Appl. No.: 10/736,907

(22) Filed: Dec. 17, 2003

(30) Foreign Application Priority Data

Jul. 22, 2003   (DE) .............................. 203 11 320.9

(51) Int. Cl.
*G01L 7/00* (2006.01)
(52) U.S. Cl. ...................................................... 73/706
(58) Field of Classification Search ................... 73/706; 324/663
See application file for complete search history.

(56) References Cited

U.S. PATENT DOCUMENTS

| | | | | |
|---|---|---|---|---|
| 4,077,261 A * | 3/1978 | Ring et al. ..................... | 73/706 |
| 5,760,310 A * | 6/1998 | Rud et al. ...................... | 73/706 |
| 6,581,469 B2 * | 6/2003 | Burczyk et al. ................ | 73/716 |
| 6,631,644 B2 * | 10/2003 | Burczyk et al. ................ | 73/716 |
| 6,883,562 B2 * | 4/2005 | Burczyk et al. ................ | 141/65 |
| 7,021,149 B2 * | 4/2006 | Dannhauer et al. ............ | 73/716 |
| 7,197,935 B2 * | 4/2007 | Woest .......................... | 73/706 |
| 7,258,059 B2 * | 8/2007 | Burczyk et al. ................ | 92/104 |
| 7,278,318 B2 * | 10/2007 | Dannhauer et al. ............ | 73/716 |
| 2004/0234382 A1 * | 11/2004 | Textor .......................... | 417/63 |
| 2007/0289386 A1 * | 12/2007 | Burczyk et al. ................ | 73/717 |

* cited by examiner

*Primary Examiner*—Andre J Allen
(74) *Attorney, Agent, or Firm*—Bacon & Thomas, PLLC

(57) ABSTRACT

A pressure transmitter for registering the pressure of a medium. The pressure transmitter includes a transmitter body, a dividing membrane attached to the transmitter body forming thereby a pressure chamber, a first pressure canal and a second pressure canal. The two pressure canals exhibit different hydraulic properties.

13 Claims, 1 Drawing Sheet

DYNAMIC PRESSURE TRANSMITTER

TECHNICAL FIELD

The present invention concerns a pressure transmitter, or a pressure sensor with a pressure transmitter, for the registering of a pressure of a medium.

BACKGROUND DISCUSSION

The pressure transmitters, which utilize a sealed dividing membrane, or diaphragm, are also referred to as pressure mediators or pressure intermediaries. Such pressure transmitters include a pressure transmitter body and a dividing, or separating, membrane. The dividing membrane is attached to the pressure transmitter body to form a pressure chamber between a top surface of the pressure transmitter body and the dividing membrane. Also included is a pressure canal, which is in communication with the pressure chamber and over which a measuring cell is loaded by means of a transfer liquid with the pressure prevailing in the pressure chamber. To the extent that the pressure transmitter is integrated in a pressure sensor, or in a measuring mechanism thereof, as the case may be, the pressure canal can extend out to a measuring cell chamber. In the case of a pressure transmitter that is arranged separated from a pressure sensor, a capillary line is connected to the pressure canal. The capillary line extends out to the pressure sensor.

When, during the process of measuring, the pressure of the medium rises rapidly, the transfer liquid is pressed out of the pressure chamber into the pressure canal. In doing this, the transfer liquid flows with a high velocity out of the pressure chamber into the narrow entrance of the pressure canal. Because of the Venturi effect, this can lead to such a decrease of the pressure in the area of the entrance that the dividing membrane is sucked locally onto the membrane bed in the vicinity of the entrance, and the entrance is closed. A measuring of pressure is no longer possible in this state, since communication between the pressure chamber and the pressure measuring cell is broken. When the entrance of the pressure canal converges conically, and this contour is impressed upon the dividing membrane, the above effect is reinforced, for, as the dividing membrane approaches the pressure canal, a kind of annular canal arises between the dividing membrane and the pressure canal in the area of the entrance, wherein the available area for liquid flow gets increasingly smaller with the approach of the dividing membrane. The net effect is a positive feedback of the Venturi effect.

SUMMARY OF THE INVENTION

It is, consequently, an object of the invention to provide a pressure transmitter of improved dynamic behavior.

The object is solved by the pressure transmitter of independent claim 1.

The pressure transmitter of the invention includes:

a pressure transmitter body;

a dividing membrane attached to the pressure transmitter body to form a pressure chamber between a top surface of the pressure transmitter body and the dividing membrane;

a first pressure canal, which extends between a first opening in the pressure chamber and a common pressure transfer path, and a second pressure canal, which extends between a second opening in the pressure chamber and the common pressure transfer path, wherein the second pressure canal exhibits other hydraulic properties than the first pressure canal.

The hydraulic properties are the flow resistance and/or the hydraulic capacitance of the first or second pressure canal, as the case may be.

The flow resistance refers to the pressure drop at a certain volume flow through the particular canal. Concomitantly, a pressure increase in the medium causes a resistance-dependent flow velocity through the pressure canals.

The hydraulic capacitance is a measure of the mass of transfer liquid that can be accommodated in the particular canal as a function of pressure. Due to the compressibility of the transfer liquid, the capacitance is a function of the constant volume of a pressure canal. Additionally, a pressure canal can have a higher capacitance due to a variable volume. A variable volume can, for example, be provided by elastically compressible or deformable bodies, e.g. a filler body or a bellows. The entrance velocity of the transfer liquid into the pressure canals in the case of a pressure increase can depend, consequently, also on the hydraulic capacitance of a given pressure canal.

Since the difference between the coefficients of thermal expansion of the usual transmission liquids and the coefficients of thermal expansion of the usual pressure transmitter materials is really quite significant, one will consider a selective volume enlargement for increasing the hydraulic capacitance only in those cases where no great temperature fluctuations are to be expected. This constraint does not apply for a control of the hydraulic resistances.

The different hydraulic properties of the two pressure canals have the following effect. Because of the different hydraulic properties, it is highly improbable that both pressure canals will have in the case of a rapid pressure increase simultaneously exactly those conditions in the regions of their entrances that the dividing membrane experiences sufficient suction at both locations because of the Venturi effect to seal both canals. When, for instance, the first canal becomes sealed by the Venturi effect, then the pressure in the first canal still rises via the second pressure canal, so that the seal is then removed and further pressure transmission via the first canal can proceed. Theoretically, oscillations between the sealed and open conditions of the entrance of the first canal, or alternating sealing of the entrances of the first and second pressure canals, can happen, but, fundamentally, there is always one canal open, so that a continuous pressure transfer between the pressure chamber and the common pressure transmission path is maintained.

The common pressure transmission path assures pressure transfer from the confluence of the first pressure canal with the second pressure canal out to a pressure measuring cell or a hydraulic adjusting member. The common pressure transmission path can, for example, include another pressure canal section in the pressure transmitter body and components connecting therewith, such as a capillary line or a measuring cell chamber. When, for example, the pressure transmitter is integrated in the measuring mechanism of a pressure sensor, then it can be that the confluence of the first pressure canal and the second measuring canal happens first in a measuring cell chamber. In this case, the common pressure transmission path would include essentially only the measuring cell chamber.

A different hydraulic resistance can be achieved by variation of the canal length and/or the canal diameter.

For example, the first canal and the second canal can each include a bore, especially an axial bore, from the pressure chamber into the pressure transmitter body, with the axial bores then being connected over different paths into the common pressure transmission path.

In one embodiment, the axial bore of the first canal is aligned with an axial bore of the common transmission path, i.e., the first bore of the first canal goes directly into the common transmission canal, while a resistance line runs between the laterally displaced, axial bore of the second canal and the axial bore of the common pressure transmission path. The difference in the flow resistance of the first and second canals is essentially determined by the length and the diameter of the resistance line. The resistance line has preferably a smaller diameter than the axial bores of the canals.

In another embodiment of the invention, separate resistance lines extend between a bore of the first canal and a bore of the common pressure transmission path and between the bore of the second canal and the bore of the common pressure transmission path, with the resistance lines having different lengths.

A resistance line can, for example, be introduced into the pressure transmitter body by a bore, especially a lateral bore, and this bore can, for instance, also serve for the filling of the transfer liquid. Equally, the pressure transmitter body can be built of a plurality, especially two, of fitted portions, wherein the resistance lines are formed in one or in a plurality of the surfaces which become internal following assembly of the portions. This can be done, for example, by appropriate milling or lathe, i.e. turning, work.

BRIEF DESCRIPTION OF THE DRAWINGS

The invention will now be explained on the basis of examples of embodiments shown in the figures, which show as follows.

DETAILED DESCRIPTION

Figure 1:
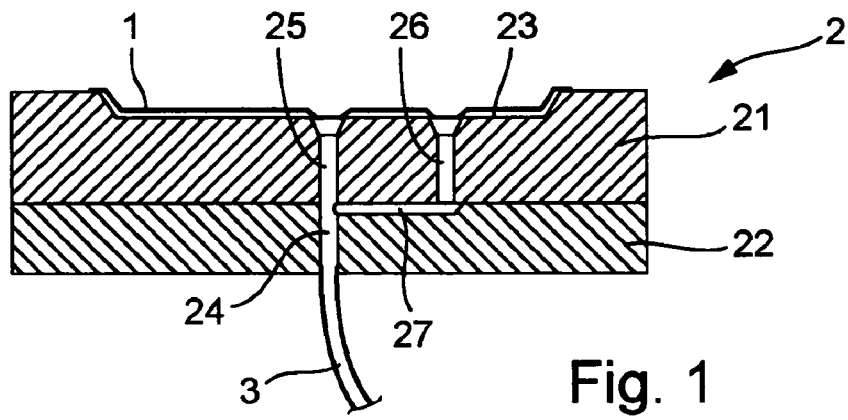
FIG. 1: a longitudinal section through a first embodiment of a pressure transmitter of the invention.

The pressure transmitter shown in FIG. 1 includes a dividing membrane 1 and a cylindrical pressure transmitter body 2, on whose top side the dividing membrane 1 is attached to form a pressure chamber. The pressure transmitter body 2 includes a cylindrical membrane-carrying-body 21 and a cylindrical base body 22, which are fitted together at their mutually facing end surfaces. The membrane carrying body 21 has on its top surface opposite that facing the base body a membrane bed 23, which is covered by the membrane 1. Extending from the middle of the membrane bed to the bottom surface of the pressure transmitter body 2 is a continuous, axial, first bore, of which a first section 25 runs in the membrane carrying body 21 and forms a first canal. A second axial bore 26 extends, radially spaced from the first bore, from the membrane bed 23 completely through the membrane carrying body 21 down to the interface between the membrane carrying body and the base body 22. In the end surface of the base body 22 facing towards the membrane carrying body 21, a groove 27 has been milled in, communicating with the second bore 26 and extending into a second section 24 of the first bore. The groove 27 and the second bore 26 form together the second canal, with the flow resistance of the second canal being greater than the flow resistance of the first canal. In particular, the flow resistance can be controlled by the cross sectional area of the groove 27.

The second section 24 of the continuous, first bore forms the first section of the common pressure transmission path, which is then continued in the embodiment by a capillary line 3.

In a variant of this embodiment, instead of groove 27, a groove is provided in the end surface of the membrane carrying body 21 facing away from the membrane bed 23. This alternate groove extends between the first section 25 of the first axial bore and the second axial bore 26. This variant is advantageous in the case where the base body is rotationally symmetric, because no angular alignment is then required, when the membrane carrying body 21 is fitted with the base body 22.

Figure 2:
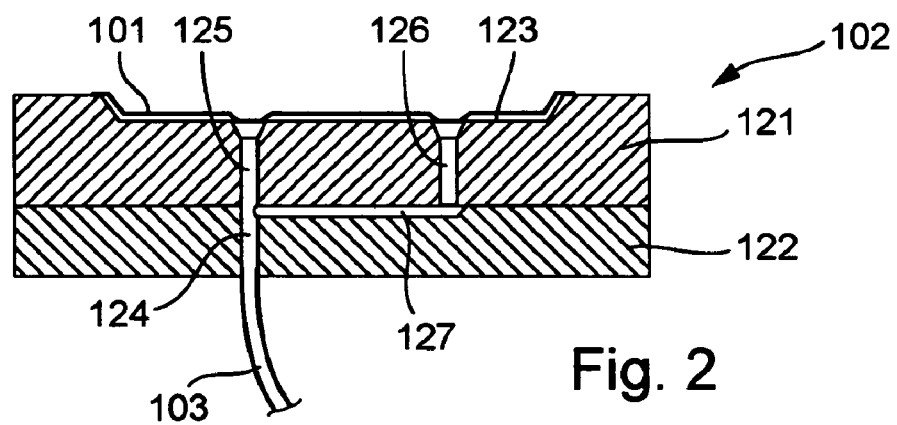
FIG. 2: a longitudinal section through a second embodiment of a pressure transmitter of the invention.

FIG. 2 shows a embodiment of the invention having essentially the same structure as the first embodiment. A pressure transmitter body 102 has, thus, again a membrane carrying body 121 and a base body 122, which are fitted together, as above described. Moreover, a first continuous, axial bore is provided having a first section 125 through the membrane carrying body 121 and a second section 124 through the base body 122, as well as a second axial bore 126, which is connected with the continuous, first axial bore by way of a groove 127 in the end surface of the base body 122 facing towards the membrane carrying body 121. However, in this case, the continuous, first axial bore is not in the middle of the membrane bed 123, but, instead, extends likewise eccentrically. The first and the second axial bores are at equal distances from the central axis of the pressure transmitter body 102, it being understood that they could also be at different distances. The displacement of the first bore away from the central axis means that the pressure- and temperature-dependent membrane stroke above the first bore differs less from the membrane stroke over the second bore. Naturally, also this embodiment can have, instead of the groove 127 in the end surface of the base body 122, a corresponding groove in the neighboring end surface of the membrane carrying body 121.

Figure 3:
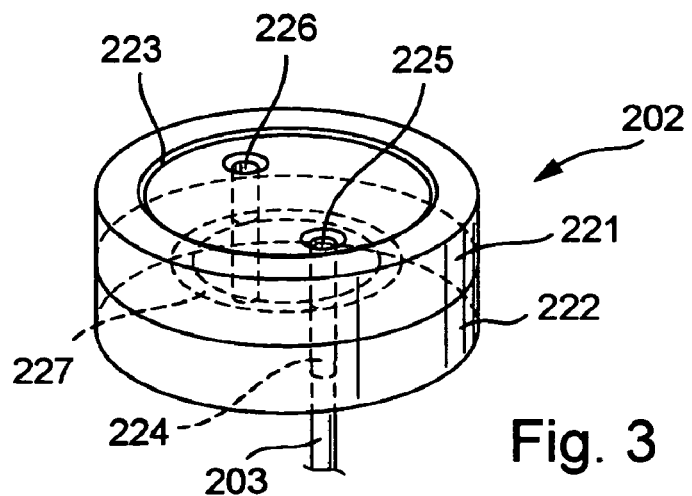
FIG. 3: a perspective drawing of a third embodiment of a pressure transmitter of the invention, showing hidden structure with dashed lines.

FIG. 3 shows finally an embodiment of a pressure transmitter having a resistance ratio which is simple to tune during manufacture. To this end, the pressure transmitter includes a pressure transmitter body 202, which again includes a base body 222 and a membrane carrying body 221, which are fitted together at mutually adjoining end surfaces. In one or both of the mutually adjoining end surfaces is formed an annular groove 227, which is coaxial with the pressure transmitter body 202 and extends along the circumference of a circle. The groove, or the unit formed by two aligned grooves, serves as a resistance line. Extending through the base body 222 is a lower axial bore 224, which communicates with the annular groove 227, i.e. the axial bore is located on the radius of the annular groove and intersects with the groove. The lower axial bore 224 forms a first section of the common pressure transmission path, which is then continued in this embodiment by a capillary line 203.

On the membrane-containing top surface of the membrane carrying body 221 is formed membrane bed 223, which is covered by a dividing membrane, omitted here for reasons of clarity. Extending from the membrane bed 223 through the membrane carrying body are two upper axial bores 225, 226, both of which communicate with the annular groove. The exact arrangement of the two bores with respect to one another is not critical, although it appears appropriate for the purpose that they have a large separation from one another. The maximum separation is achieved when the two bores are exactly opposite one another, referenced to the annular groove. Now, when during measuring operation the medium pressure acting on the dividing membrane rises, the transfer liquid must reach the lower axial bore 224 by way of the two upper axial bores 225, 226 and the annular groove 227. The effective flow resistances for a first pressure canal and for a second pressure canal, respectively, now are the result of contributions from the flow resistance of the upper axial bores and the resistance of the shortest connection to the lower bore 224 by way of the annular groove 227.

By selection of the azimuth angle between the base body 222 and the membrane carrying body 221, the resistance ratio can, therefore, be tuned during the assembly of the pressure transmitter body. In the drawing of FIG. 3, for example, the first upper bore 225 is aligned with the lower bore 224, while the second upper bore is displaced with respect to the lower bore by 180°. Here, the difference between the flow resistances is maximum. If the membrane carrying body is rotated by 90° with respect to the drawn position, then both upper bores are rotated by 90° with respect to the lower bore, and the flow resistances would be identical, assuming that equal diameters are present in the upper bores. Between these extremes, the resistance ratio can be determined by choice of the azimuth angle between the membrane carrying body 221 and the base body 222. By choosing the flow cross section of the annular groove, the maximum possible resistance difference between the two canals becomes predetermined.

In the above-described examples of embodiments, axial bores of always equal diameters have been used on an introductory basis. Naturally, the bores can also be of different diameters, in order to achieve different resistances. In the same vain, the bores can, as well, deviate from the axial direction.

The invention claimed is:

1. A pressure transmitter, comprising:
a pressure transmitter body having a top surface;
a dividing membrane attached to said pressure transmitter body to form a pressure chamber between said top surface and said dividing membrane;
a first pressure canal, which extends between a first opening in said pressure chamber and a common pressure transfer path; and
a second pressure canal, which extends between a second opening in said pressure chamber and said common pressure transfer path, wherein:
said second pressure canal exhibits other hydraulic properties than said first pressure canal.

2. The pressure transmitter as claimed in claim 1, wherein:
said other hydraulic properties include flow resistance and/or hydraulic capacitance of said first and second pressure canals, respectively.

3. The pressure transmitter as claimed in claim 1, wherein:
said common pressure transfer path includes a capillary line and/or a measuring cell chamber.

4. The pressure transmitter as claimed in claim 1, wherein:
said first canal and said second canal each includes an axial bore from said pressure chamber into said pressure transmitter body; and
the axial bores are connected over different paths into said common pressure transmission path.

5. The pressure transmitter as claimed in claim 4, wherein:
the axial bore of said first canal is aligned with, and goes into, an axial bore of said common transmission path, and a resistance line runs between a laterally displaced, axial bore of said second canal and the axial bore of said common pressure transmission path.

6. The pressure transmitter as claimed in claim 5, wherein:
said resistance line has a smaller cross sectional area than the axial bores of said first and second pressure canals.

7. The pressure transmitter as claimed in claim 4, wherein:
resistance lines extend between a bore of said first canal and a bore of said common pressure transmission path and between the bore of said second canal and the bore of said common pressure transmission path, with said resistance lines having different lengths.

8. The pressure transmitter as claimed in claim 7, wherein:
said resistance lines include sections of an annular canal.

9. The pressure transmitter as claimed in claim 1, wherein:
said pressure transmitter body is composed of at least two portions which are fitted together; and
at least one of said pressure canals has a section which is formed in a surface which becomes an internal surface after the fitting of the portions together.

10. The pressure transmitter as claimed in claim 8, wherein:
said section is a milled or turned depression.

11. The pressure transmitter as claimed in claim 8, wherein:
said section forms a resistance line.

12. A pressure sensor having:
a pressure measuring cell; and
a pressure transmitter comprising: a pressure transmitter body having a top surface; a dividing membrane attached to said pressure transmitter body to form a pressure chamber between said top surface and said dividing membrane; a first pressure canal, which extends between a first opening in said pressure chamber and a common pressure transfer path; and a second pressure canal, which extends between a second opening in said pressure chamber and said common pressure transfer path, said second pressure canal exhibiting other hydraulic properties than said first pressure canal, wherein:
said pressure measuring cell is loadable by way of said common pressure transmission path with the pressure prevailing in said pressure chamber; and
said second pressure canal exhibits other hydraulic properties than said first pressure canal.

13. The pressure sensor as claimed in claim 12, further comprising:
a measuring cell chamber, which is formed in said pressure transmitter body, wherein:
said pressure measuring cell is arranged in said measuring cell chamber.

* * * * *